US012634661B2

(12) United States Patent
Simon

(10) Patent No.: US 12,634,661 B2
(45) Date of Patent: May 19, 2026

(54) DEVICE AND METHOD FOR CONTROLLING THE RADIATION OF A COMMUNICATION DEVICE

(71) Applicant: ORANGE, Issy-les-Moulineaux (FR)

(72) Inventor: Pierre-Henri Simon, Chatillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 321 days.

(21) Appl. No.: 18/251,459

(22) PCT Filed: Nov. 4, 2021

(86) PCT No.: PCT/FR2021/051945
§ 371 (c)(1),
(2) Date: May 2, 2023

(87) PCT Pub. No.: WO2022/096830
PCT Pub. Date: May 12, 2022

(65) Prior Publication Data
US 2024/0015482 A1     Jan. 11, 2024

(30) Foreign Application Priority Data
Nov. 3, 2020    (FR) ...................................... 2011276

(51) Int. Cl.
*H04W 4/06*        (2009.01)
*H04W 84/12*       (2009.01)
*H04W 88/12*       (2009.01)
(52) U.S. Cl.
CPC .............. *H04W 4/06* (2013.01); *H04W 84/12* (2013.01); *H04W 88/12* (2013.01)

(58) Field of Classification Search
None
See application file for complete search history.

(56) References Cited

U.S. PATENT DOCUMENTS

2020/0092729 A1     3/2020  Boucadair et al.

FOREIGN PATENT DOCUMENTS

WO        2008127750 A2    10/2008

OTHER PUBLICATIONS

PCT/FR2017/053617 (Year: 2018).*
English translation of the Written Opinion of the International Searching Authority dated Feb. 11, 2022 for corresponding International Application No. PCT/FR2021/051945, filed Nov. 4, 2021.
(Continued)

*Primary Examiner* — Walter J Divito
(74) *Attorney, Agent, or Firm* — David D. Brush; Westman, Champlin & Koehler, P.A.

(57)        ABSTRACT

A device and a method for controlling radiation from a local radio wave communication device, in particular the radiation of radio waves for a local wireless communication device, such as Wifi™, Bluetooth™ etc. The control device includes a controller of a direction of transmission of local radio waves from the communication device. Thus, since the direction of transmission of the radio waves is controlled, a broadcasting thereof to outside of a residence can be avoided and risk of hacking can be limited. In addition, this can also reduce unnecessary exposure to radio waves, in particular by avoiding the transmission of radio waves to bedrooms.

10 Claims, 3 Drawing Sheets

(56)             References Cited

OTHER PUBLICATIONS

Netspot, "Use WiFi Heatmaps for network improvements", Aug. 7, 2010 (Aug. 7, 2010), pp. 1-9, only odd pages retrieved by EPO on Feb. 7, 2018, from the Internet: URL:https://www.netspotapp.com/de/wifi-heatmapper.html, XP055489346.

Netspot, "Use WiFi Heatmaps for network improvements", English translation (only odd pages available) made by EPO in 2018.

Xi Xiong et al., "Customizing Indoor Wireless Coverage via 3D-Fabricated Reflectors", BuildSys'17, Nov. 8-9, 2017, Delft, The Netherlands, https://doi.org/10.1145/3137133.3137148.

Anmol Sheth et al., "Geo-fencing:Confining Wi-Fi-Coverage to Physical Boundaries", Pervasive 2009, LNCS 5538, pp. 274-290.

Arun Venkat et al., "RFocus: Practical Beamforming for Small Devices", May 13, 2019 (May 13, 2019), Retrieved from the Internet: URL:https://arxiv.org/pdf/1905.05130.pdf, XP055813966.

International Search Report dated Feb. 11, 2022 for corresponding International Application No. PCT/FR2021/051945, filed Nov. 4, 2021.

Written Opinion of the International Searching Authority dated Feb. 11, 2022 for corresponding International Application No. PCT/FR2021/051945, filed Nov. 4, 2021.

* cited by examiner

[Fig 1]
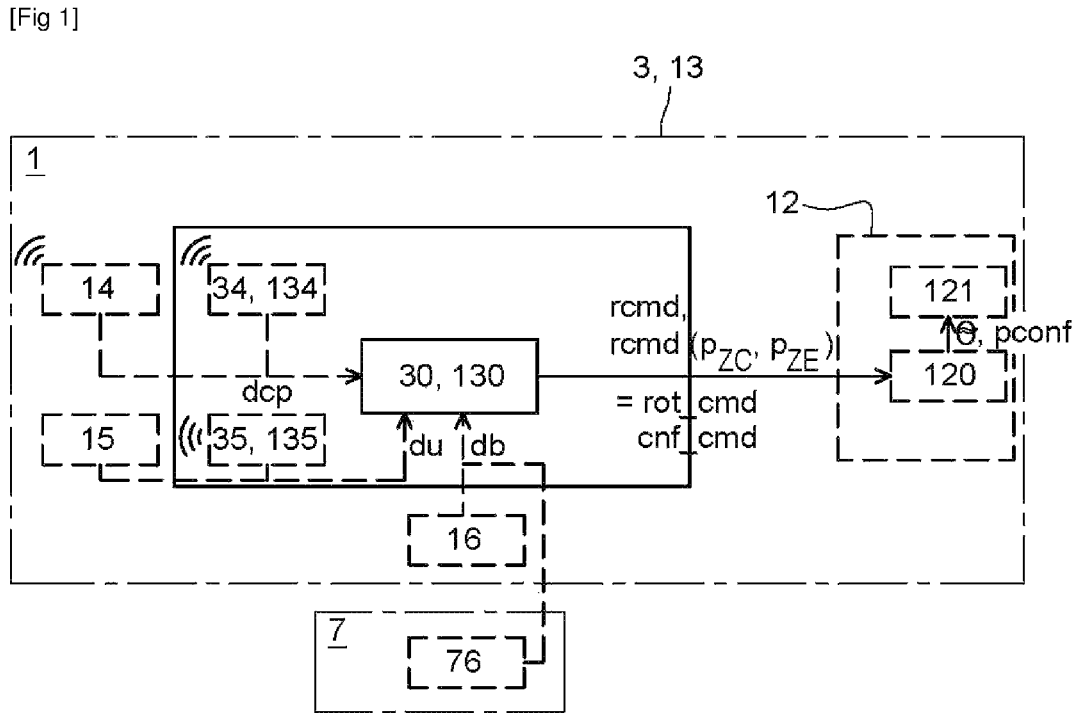
[Fig 2]

[Fig 3a]
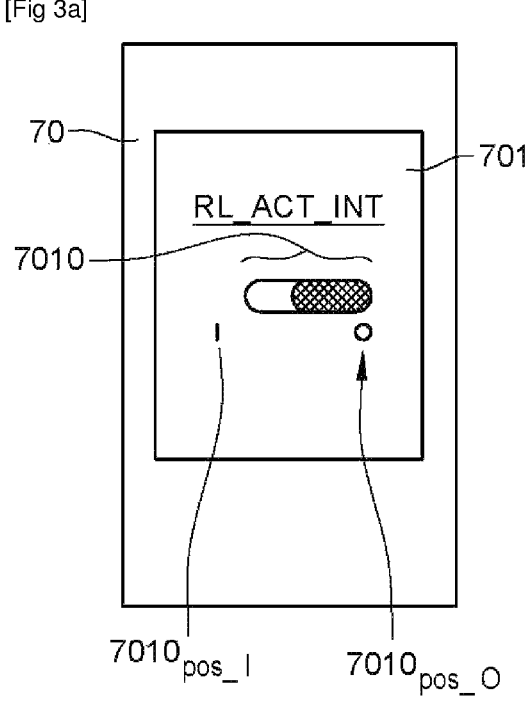
[Fig 3b]
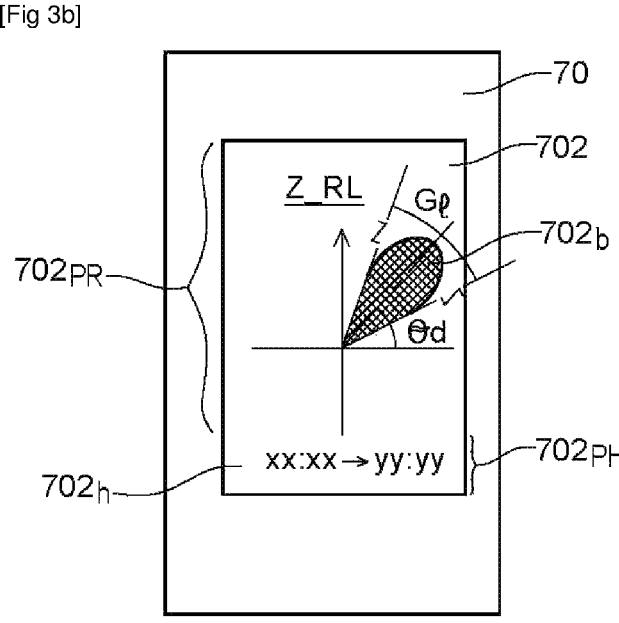

[Fig 3c]
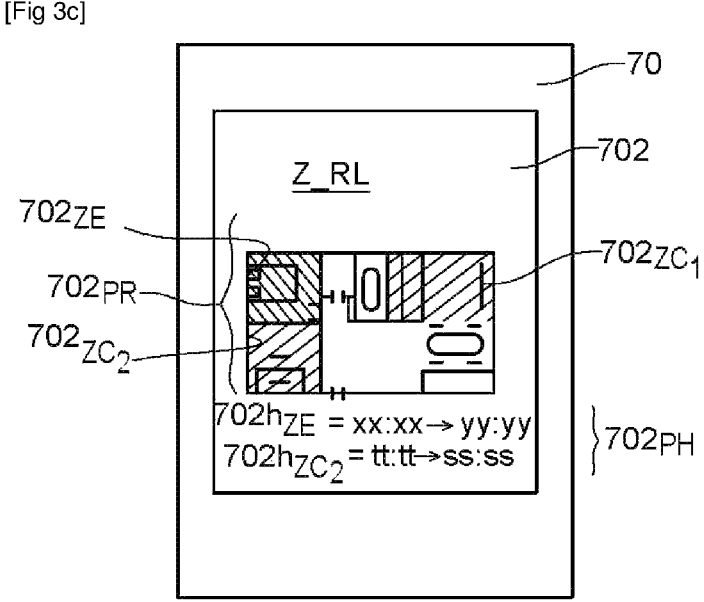
[Fig 4]
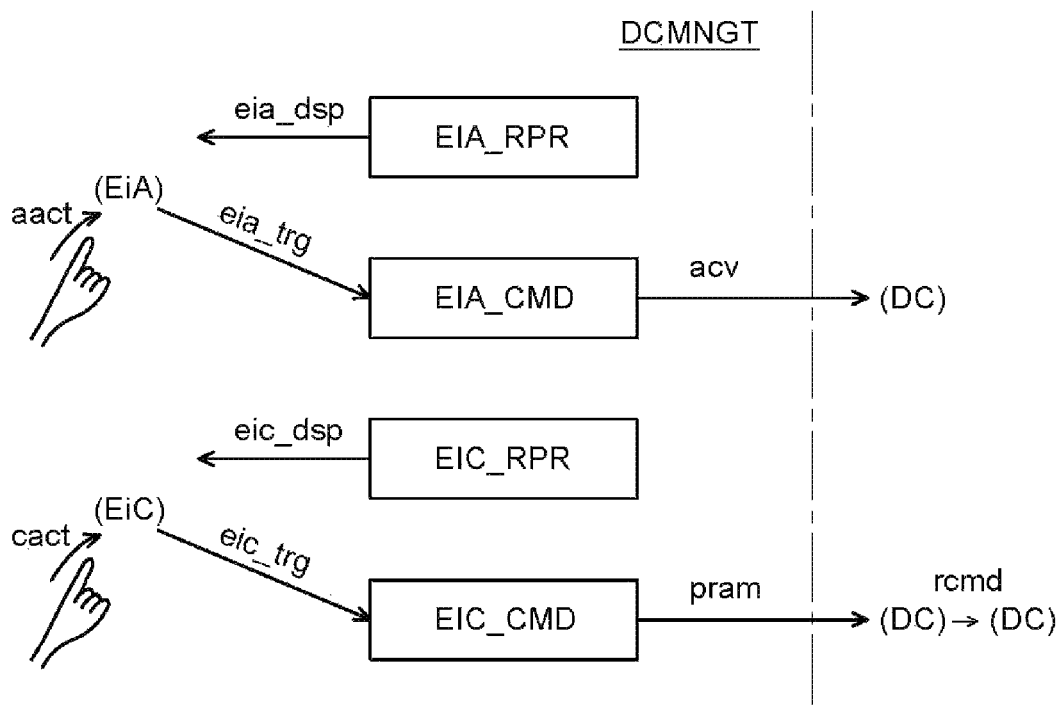

1

DEVICE AND METHOD FOR CONTROLLING THE RADIATION OF A COMMUNICATION DEVICE

CROSS-REFERENCE TO RELATED APPLICATIONS

This Application is a Section 371 National Stage Application of International Application No. PCT/FR2021/051945, filed Nov. 4, 2021, which is incorporated by reference in its entirety and published as WO 2022/096830 A1 on May 12, 2022, not in English.

TECHNICAL FIELD

The invention relates to a device and a method for controlling the radiation from a communication device, notably the radiation of the radio waves for a wireless local communication device, such as Wifi™, Bluetooth™, etc.

STATE OF THE ART

Local area networks are generally provided with a home gateway. The home gateway is a device allowing a user to connect one or more terminals to the Internet network that is generally wired (copper, fiber, etc.). The terminals are connected to the home gateway by wire (Ethernet) or, more often, via a wireless home communication network notably based on the Wifi™ protocols. The principle of the so-called Wifi™ network is to link, by local radio waves, several electronic devices within a wireless local communication network in order to allow the transmission of data between them and communication devices of the Internet network to which the home gateway is connected. These days, the home gateway is able to communicate in Wifi mode with the equipment of the wireless local communication network by broadcasting local radio waves in all directions. It is, if necessary, possible to stop the Wifi transmission by time slot programming.

Now, depending on the location of the home gateway in the home of the user, the Wifi™ radiation can not only not cover all of the home of the user but, in addition, unnecessarily, or even disturbingly, cover certain rooms of the home of the user, notably rooms such as those of young children, the home of one or more neighbors, or a public place provided with an access point (also called hot-spot). The solutions currently proposed to resolve this issue allow the user to test his or her Wifi in his or her home in order to define the best location for the home gateway in the home. For example, software services implemented, for example, on a communication terminal such as a smartphone or a tablet make it possible to measure the strength of the Wifi signal received at the point where this terminal is located. Thus, the Wifi coverage of the home will be optimized but not necessarily total depending on the dimensioning of the home and the strength of Wifi transmission of the home gateway. Furthermore, that does not resolve the issues of Wifi transmission out of the home.

Now, the Wifi transmission out of the home, in addition to the fact that it generates a disturbance of the external Wifi network, can also bring with it an increased risk of hacking of the Wifi network of the user.

SUMMARY OF THE INVENTION

One of the aims of the present invention is to remedy the drawbacks/inadequacies of the state of the art/provide improvements over the state of the art.

One subject of the invention is a device for controlling the local radiation from a local radio wave communication device, the controlling device comprises a controller of the direction of transmission of local radio waves from the communication device.

Thus, since the direction of transmission of the radio waves is controlled, the broadcasting therefrom to the outside of the home can be avoided and the risks of hacking limited. Furthermore, that can also make it possible to reduce the unnecessary exposure to the radio waves, notably by avoiding the transmission of the radio waves to the bedrooms.

Advantageously, the controller generates a local radio wave transmission direction command comprising at least one parameter defining a zone out of the following:
a zone of coverage of transmission of local radio waves,
a zone of exclusion from transmission of local radio waves.

Thus, the direction of transmission of the radio waves is controlled to optimize the connection and/or avoid inappropriate radio exposure (disturbance of a Wifi network of a third party, risk of hacking, unnecessary exposure of the user, etc.).

Advantageously, the controller generates a local radio wave transmission direction command out of the following:
a rotation command for a rotating directional antenna of the communication device;
a configuration command for a reconfigurable antenna of the communication device.

Advantageously, the controller generates a local radio wave transmission direction command as a function of at least one datum out of the following:
sensed data from propagation of local waves;
sensed data from use of the communication device;
necessary input data of the communication device.

Thus, the controlling is automated as a function of sensed data and/or parameterized by the user, notably according to his or her needs (for example definition of zone of use of the wireless local area network and of "white" zone in which the radio radiation is unwanted).

Another subject of the invention is a method for controlling the orientation of the local radiation from a local radio wave communication device, the control method comprises a control of the direction of transmission of local radio waves from the communication device.

A subject of the invention is also a communication device comprising at least one local radio wave transmission antenna, wherein the transmission antenna comprises a modifier of the direction of transmission of local radio waves that can be controlled by a local radiation controlling device.

Advantageously, the communication device further comprises a local radiation controlling device. Thus, the controlling is performed without delay linked to the transmissions between the controlling device and the communication device, further reducing the risks of problems of connection of the communication device linked to an inappropriate orientation of the radiation because of an absence of communication with the controlling device.

Advantageously, the transmission antenna is one out of the following:
a rotating directional antenna;
a reconfigurable antenna.

Thus, in the case of a rotating directional antenna, a direction of transmission is prioritized which is particularly appropriate when the communication device, notably the home gateway, is placed in a corner of the home of the user thus concentrating the transmission strength in the home of the user and reducing the latter outside.

A reconfigurable antenna thus makes it possible to more finely configure the zones covered and not covered by the transmission of radio waves, notably to define a radio coverage by rooms: cover the living room but not the adjoining room, etc.

Advantageously, the communication device is a device that can be connected to a wireless local communication network out of the following: a home gateway, a communication terminal.

Thus, not only can the invention be implemented in a home gateway, but also in other communication devices, in particular fixed devices such as an office computer, a connected television. In the case of such communication terminals, a single direction of transmission will be able to be defined once the home gateway and the terminal are positioned in the home of the user (that is to say following the associating of the terminal with the home gateway) with a single radiation beam that is relatively fine and powerful toward the home gateway, or several beams: the most powerful to the home gateway and possibly other beams that are less powerful because less intensive in terms of data transmission to peripheral devices such as printers for the continuation of the current communication when associating the terminal with the gateway, but also for any new communication thus avoiding the omnidirectional radiation from the communication terminal in subsequent communications.

A subject of the invention is also an interface for managing a local radio wave communication device, the management interface comprises:

an interface for activating the local radio wave communication device; and an interface of a device for controlling the local radiation from the communication device, called radiation controlling interface, said radiation controlling interface comprising an interface for parameterizing the device for controlling the local radiation from the communication device.

Advantageously, the management interface can be implemented in a communication terminal connected to the wireless local communication network.

Thus, the user can monitor, or even manage, the control from any communication terminal, such as a connected television, a handheld or mobile terminal, notably a smartphone, a tablet, etc.

A subject of the invention is also a method for managing a local radio wave communication device comprising:

a reproduction of at least one interaction element capable of allowing an activation of the local radio wave communication device, and a reproduction of at least one element of interaction with a parameterizing of the device for controlling the local radiation from the communication device.

Advantageously, the at least one element of interaction with a parameterizing of the controller that is reproduced corresponds to a room of a reproduced plan of a building in which the communication device transmits local radio waves.

Advantageously, the at least one element of interaction with a parameterizing of the controller that is reproduced comprises one out of the following parameters:

a radiation mode, an activation of a radiation mode, a power of a radiation mode, a direction of a radiation mode, a scheduling of a radiation mode, an event that can be determined as a function of sensed data, the event being able to trigger an activation of a radiation mode.

Advantageously, according to one implementation of the invention, the different steps of at least one method according to the invention are implemented by software or a computer program, this software comprising software instructions intended to be run by a data processor of a device forming part of the controlling device and/or of the management interface and being designed to control the execution of the different steps of this method.

The invention therefore also targets a program comprising program code instructions for the execution of the steps of the method for controlling the orientation of the local radiation and/or of the method for managing a communication device when said program is run by a processor.

This program can use any programming language and be in the form of source code, object code or intermediate code between source code and object code such as in a partially compiled form or in any other desirable form.

BRIEF DESCRIPTION OF THE DRAWINGS

The features and advantages of the invention will emerge more clearly on reading the description, given by way of example, and the figures relating thereto which represent:

FIG. 1, a simplified diagram of a communication architecture comprising a controlling device and a communication device according to the invention, FIG. 2, a simplified diagram of a controlling method according to the invention, FIG. 3a, a simplified diagram of a management interface according to the invention illustrating an interface for activating a radiation of a communication device, FIG. 3b, a simplified diagram of a management interface according to the invention illustrating a first embodiment of an interface for controlling a radiation from a communication device, FIG. 3c, a simplified diagram of a management interface according to the invention illustrating a second embodiment of an interface for controlling a radiation from a communication device, FIG. 4, a simplified diagram of a method for managing a communication device according to the invention.

DESCRIPTION OF THE EMBODIMENTS

FIG. 1 illustrates a simplified diagram of a communication architecture comprising a controlling device and a communication device according to the invention.

The controlling device 3, 13 controls a local radiation from a local radio wave communication device 1. The controlling device 3, 13 comprises a controller 30, 130 of the direction of transmission of local radio waves from the communication device.

In a first embodiment of the controlling device, the controlling device 13 is implemented in the communication device 1.

In a second embodiment of the controlling device, the controlling device 3 is implemented outside of the communication device 1. In particular, in this second embodiment, the controlling device 3 can be implemented either in local equipment, such as a communication terminal 7 or one that is not illustrated, or in remote equipment (not illustrated). In the case where the controlling device 3 is implemented in remote equipment, it is connected to the communication device via a remote communication network, such as the Internet. The remote equipment is notably operator equipment and/or a service provision device.

In particular, the controller 30, 130 generates a local radio wave transmission direction command rcmd comprising at least one parameter defining a zone $p_Z$ out of the following:

a zone of coverage of the transmission of local radio waves $p_{ZC}$, a zone of exclusion from the transmission of local radio waves $p_{ZE}$.

In particular, the controller 30, 130 generates a local radio wave transmission direction command rcmd out of the following:

a rotation command rot_cmd for a rotating directional antenna 12 of the communication device 1;

a configuration command cnf_cmd for a reconfigurable antenna 12 of the communication device 1.

In particular, the controller 30, 130 generates a local radio wave transmission direction command rcmd as a function of at least one datum out of the following:

sensed data from propagation of local waves dcp;

sensed data from use of the communication device du;

necessary input data for the communication device db.

The controller then controls the direction of transmission of local radio waves from at least one of these data.

The use of the sensed data from propagation of local waves notably makes it possible to establish the zones of a home that are covered or not covered by the transmission of local radio waves when they are transmitted in all directions. For example, a user picks up, by means of a cellphone, the local radio waves at different points of the home, even outside of the home, thus making it possible to establish a mapping of the broadcasting of the local waves transmitted by the communication device. Thus, the controlling device will if necessary be able to redirect the strength of transmission of local radio waves from zones covered unnecessarily (outside zones, zones selected as not covered by the user, etc.) to zones that are less well covered in the home (because they are far away from the communication device or separated therefrom by an obstacle).

The use of sensed data from use corresponds notably to the use of historical exchange data between the communication device and one or more communication terminals in the home (the history comprising at least usage directions possibly associated with usage bands). For example, the direction of use is determined by a sensor of the direction of reception of signals transmitted in local radio mode by a communication terminal exchanging with the communication device, or by the provision of position information (such as GPS coordinates) supplied by the communication terminal, notably on request from the communication device, etc.

The use of input data corresponds to the taking into account of need expressed by the user, notably by means of a management interface, such as, directly, the needs in terms of direction: in degrees and a beam width for example, it being understood for example that 0° corresponds to the direction at right angles to the front panel of the router, or needs in terms of use of the local radio waves (time slot and zone of use).

In particular, sensors are implemented in the controlling device 3, 13 and/or the communication device 1. These sensors, respectively local wave propagation sensors 14, 34, 134, and sensors of use of the communication device 15, 35, 135, supply the sensed data, respectively the sensed data from propagation of local waves dcp and the sensed data from use du.

In particular, an input interface (keyboard, microphone, etc.) 16, 76 implemented either directly in the communication device 1, or in a communication terminal 7 distinct from the communication device, allows at least one user of the communication device to input necessary data for the communication device 1. For example, by indicating that the communication device will be used in a first direction or zone over a first time band (for example working hours for an office), or will not be used in a second direction or zone over a second time band (for example, the room at night or a time band determined by the parents for the room of children thus allowing parental control).

The communication device 1 comprises at least one local radio wave transmission antenna 12. The transmission antenna 12 comprises a modifier 120 of the direction of transmission of local radio waves that can be controlled by a local radiation controlling device 3, 13.

In one embodiment of the transmission antenna, the transmission antenna 12 comprises a motor 121 allowing the rotation thereof when the transmission antenna is a rotating antenna. In this case, the direction modifier 120 supplies to the motor 121 in particular an angle of rotation θ in which the rotating antenna 12 will be placed. Thus, the radiation of the local waves transmitted by the rotating antenna 12 will be directed in the direction θ according to the controlling rcmd of the controlling device 3, 13.

When the rotating antenna 12 is able to radiate in several directions, it is possibly provided with several motors 121 making it possible to modify different radiation directions independently of one another. In this case, the direction modifier 120 can provide one or more rotation angles θ according to the motors 121 that are wanted to be controlled. Thus, one or more directions of radiation of the local waves transmitted by the rotating antenna 12 will be modified in one or more of the directions θ according to the controlling rcmd of the controlling device 3, 13.

In an alternative embodiment of the transmission antenna, when the transmission antenna 12 is a reconfigurable antenna, the transmission antenna 12 comprises a configurator 121 capable of modifying the radiation pattern of the transmission antenna: notably at least one data characteristic of this radiation pattern of the transmission antenna 12 out of the following: the number of lobes, the gain of at least one of the lobes, the directivity of at least one of the lobes. In this case, the direction modifier 120 supplies to the configurator 121 in particular at least one configuration parameter pconf used to reconfigure the reconfigurable antenna 12. Thus, the radiation of the local waves transmitted by the rotating antenna 12 will be directed according to the requested configuration pconf as a function of the controlling rcmd of the controlling device 3, 13.

In particular, the communication device 1 further comprises the local radiation controlling device 13.

In particular, the transmission antenna 12 is one out of the following:

a rotating directional antenna;

a reconfigurable antenna.

A reconfigurable antenna is notably an antenna with controllable radiation, for example controllable by means of software.

In particular, the communication device 1 is a device that can be connected to a wireless local communication network out of the following: a home gateway, a communication terminal.

FIG. 2 illustrates a simplified diagram of a controlling method according to the invention.

The method for controlling PPORL the orientation of the local radiation from a local radio wave communication device controls the communication device 1. This controlling method PPORL can be implemented in the communication device 1 or in other communication equipment distinct from the communication device 1, such as a communication terminal 7 or a remote service provision device. The controlling method PPORL comprises a control of direction DIR_CNT of transmission of local radio waves from the communication device 1.

In particular, the controlling method PPORL uses sensed data, notably sensed data from propagation of local waves dcp, and/or sensed data from use of the communication device du, and/or input data db. Possibly, the controlling method PPORL receives (not illustrated) at least a part of these sensed data dcp, du and/or these input data db from the communication device 1 and/or from a third-party device such as a communication terminal 7. Alternatively or in addition, the controlling method PPORL captures, in particular at least a part of these sensed data. For example, the controlling method comprises a capture from propagation of local waves PROP_CPT which supplies sensed data from propagation of local waves dcp and/or a capture from use of the communication device US_CPT which supplies sensed data from use of the communication device du.

In particular, the controlling method PPORL generates CMD_GN a local radio wave transmission direction command rcmd according to at least one datum out of the following:

sensed data from propagation of local waves dcp;
sensed data from use of the communication device du;
necessary input data for the communication device db.

The direction command generation CMD_GN is possibly implemented by the direction control DIR_CNT.

In particular, the controlling method PPORL generates a local radio wave transmission direction command rcmd comprising at least one parameter defining a zone $p_Z$ out of the following:

a zone of coverage of the transmission of local radio waves $p_{ZC}$;
a zone of exclusion from transmission of local radio waves $p_{ZF}$.

In particular, the controlling method PPORL generates a local radio wave transmission direction command rcmd out of the following:

a rotation command rot_cmd for a rotating directional antenna 12 of the communication device 1;
a configuration command cnf_cmd for a reconfigurable antenna 12 of the communication device 1.

In particular, the controlling method PPORL transmits CMD_TR the direction command rcmd to the transmission antenna 12. The direction command transmission CMD_TR is possibly implemented by the direction control DIR_CNT.

FIGS. 3a to 3c illustrate a management interface according to the invention respectively reproducing an activation interface, a management interface in a first embodiment and a second embodiment.

The management interface 70 of a local radio wave communication device 1 comprises:

an interface 701 for activating the local radio wave communication device (illustrated by FIG. 3a), and
an interface of a device for controlling the local radiation 702 from the communication device, called radiation controlling interface (illustrated by FIGS. 3b and 3c), said radiation controlling device 702 comprising a parameterizing interface $702_{PR}$ of the device for controlling the local radiation 3, 13 from the communication device 1.

In particular, the parameterizing interface $702_{PR}$ of the device for controlling the local radiation 3, 13 is a parameterizing interface of the local radio wave transmission direction controller 30, 130 implemented in the device for controlling the local radiation 3, 13.

In particular, the management interface 702 can be implemented in a communication terminal 7 connected to the wireless local communication network.

FIG. 3a illustrates a simplified diagram of a management interface according to the invention illustrating an interface for activating a radiation from a communication device.

In particular, the management interface 70 comprises a reproducer of the activation interface 701. FIG. 3a illustrates the case of a management interface 70 and of an activation interface 701 that are reproduced by display on a screen of a communication terminal 7. These interfaces 70 and 701 can possibly be reproduced vocally for example through a connected speaker 7 making it possible to orally command the activation and the deactivation of the local radiation from a home gateway.

The activation will be possible only if it has been programmed in advance (activation time slot) or if the communication terminal 7 is connected directly (wired connection since the local radiation is deactivated) or indirectly to the communication device (via a service provision device managing the activation of the communication device 1, a service provision device to which the communication terminal 7 is connected notably via a remote wireless communication: 4G, 5G) in the activation command.

In particular, the activation interface 701 reproduces an identification RL_ACT_INT allowing the user to know the interface with which he or she is interacting.

In particular, the activation interface 701 reproduces a switch 7010 having two positions $7010_{pos\_I}$ and $7010_{pos\_O}$ corresponding respectively to a position of deactivation and a position of activation. Thus, the user dragging the reproduced switch 7010 into the position $7010_{pos\_I}$, respectively the position $7010_{pos\_O}$, triggers a deactivation, respectively an activation, of the local wave radiation from the communication device 1.

Possibly, the activation interface 701 further comprises a programming parameterizing interface (not illustrated). Thus, the user can program several activations/deactivations in advance.

FIG. 3b illustrates a simplified diagram of a management interface according to the invention illustrating a first embodiment of an interface for controlling a radiation from a communication device.

In particular, the radiation controlling interface 702 comprises a reproducer of the radiation controlling interface 702. FIG. 3b illustrates the case of a management interface 70 and of a radiation controlling interface 702 that are reproduced by display on a screen of a communication terminal 7. These interfaces 70 and 702 can possibly be reproduced vocally for example through a connected speaker 7 making it possible to orally command the direction of local radiation from a home gateway.

In particular, the radiation controlling interface 702 reproduces an identification Z_RL allowing the user to know the interface with which he or she is interacting.

In particular, the radiation parameterizing interface $702_{PR}$ of the radiation controlling interface 702 reproduces, initially, the radiation pattern of the antenna of the communication device 1. The user can thus interact with this radiation pattern $702b$. In the example of FIG. 3b, the radiation pattern comprises a single lobe. The user can interact with the directivity of this lobe $\theta_d$ and/or its gain $G_I$. The parameters that are thus modified by the user: directivity $\theta_d$ and/or gain $G_t$, are transmitted via the radiation controlling interface 702 to the controlling device 3, 13 to generate the controlling command rcmd.

In particular, the radiation controlling interface 702 further comprises a programming parameterizing interface $702_{PH}$. Thus, the user can program several different local radiation configurations in advance. In particular, the programming parameterizing interface $702_{PH}$ comprises an input interface for at least one instant of modification of the radiation and/or of at least one time slot $702_h$ as illustrated by FIG. 3b. The parameters thus modified by the user, time slot $702_h$, are transmitted via the radiation controlling interface 702 to the controlling device 3, 13 to generate the controlling command rcmd at the programmed instant. If a time slot $702_h$ is transmitted, the controlling device 3, 13 will generate a controlling command rcmd making it possible, in particular, to revert to a default radiation configuration at the end of the indicated slot if another configuration has not been programmed by the user.

FIG. 3c illustrates a simplified diagram of a management interface according to the invention illustrating a second embodiment of an interface for controlling a radiation from a communication device.

In particular, the radiation controlling interface 702 comprises a reproducer of the radiation controlling interface 702. FIG. 3c also illustrates the case of a management interface 70 and of a radiation controlling interface 702 that are reproduced by display on a screen of a communication terminal 7. These interfaces 70 and 702 can possibly be reproduced vocally for example through a connected speaker 7 making it possible to orally command the direction of the local radiation from a home gateway.

In particular, the radiation controlling interface 702 reproduces an identification Z_RL allowing the user to know the interface with which he or she is interacting.

In particular, the radiation parameterizing interface $702_{PR}$ of the radiation controlling interface 702 reproduces, initially, a plan of the local building and of the zones of this building covered by the antenna of the communication device 1. The user can thus interact with this plan 702b. In the example of FIG. 3c, the plan comprises 5 zones (4 rooms: a bedroom, an office, a bathroom, and a living room divided into two zones: kitchen and lounge). The user can interact with this plan to indicate the zones to be covered by the local radiation and the zones which should not be covered by this local radiation. In our example, the user indicates that the zones corresponding to the office $702_{ZC2}$ and to the lounge $702_{ZC1}$ should be covered, but that the zone of the bedroom $702_{ZE}$ should not be covered. The parameters thus modified by the user $702_{ZC1}$, $702_{ZC2}$ and $702_{ZE}$ are transmitted via the radiation controlling interface 702 to the controlling device 3, 13 to generate the controlling command rcmd.

In particular, the radiation controlling interface 702 further comprises a programming parameterizing interface $702_{PH}$. Thus, the user can program several different local radiation configurations in advance. In particular, the programming parameterizing interface $702_{PH}$ comprises an input interface for at least one instant of modification of the radiation and/or of at least one time slot $702_{hZE}$, $702_{hZC2}$ as illustrated by FIG. 3c. The parameters thus modified by the user, time slot $702_{hZE}$, $702_{hZC2}$, are transmitted via the radiation controlling interface 702 to the controlling device 3, 13 to generate the controlling command rcmd at the programmed instant. In our example, the user can therefore indicate his or her working time slot $702_{hZC2}$ as office coverage time slot $702_{ZC2}$ and his or her sleeping time slot $702_{hZE}$ as time slot for non-coverage of the bedroom $702_{ZE}$.

Thus, the proposed solution makes it possible to control the radiation of local radio waves, such as Wifi, notably from a home gateway by a third-party device, in particular an application implemented by a smartphone, a tablet, a computer, etc., and to prioritize, in this way, certain radiation zones, even program a radiation in such a zone over such a time slot.

In particular, the zone will be able to be defined according to different parameters: cardinal points, angular sector/cone from the position of the communication device 1. The radiation will then be channeled in this direction, making it possible to either eliminate any radiation outside or at the very least considerably reduce the radiation strength outside. Considerably being understood to mean that the radiation power is insufficient to transmit and/or receive data, and/or that the radiation power is below thresholds recommended for health, sleep, etc.

FIG. 4 illustrates a simplified diagram of a method for managing a communication device according to the invention.

The method for managing DCMNGT a local radio wave communication device comprises:

a reproduction EIA_RPR of at least one interaction element EIA capable of allowing an activation of the local radio wave communication device DC, and a reproduction EIC_RPR of at least one element of interaction with a parameterizing of the local radio wave transmission direction controlling device DP of the communication device DC, also called element of interaction with the parameterizing of the radiation EIC.

In particular, the management method DCMNGT comprises a command for an activation/deactivation EIA_CMD of the communication device DC following the reproduction of an activation interaction element EIA_PRP when the user performs an activation/deactivation interaction aact with the activation interaction element EIA.

For example, when the user drags aact the switch illustrated by FIG. 3a into a position of activation (respectively into a position of deactivation) on a touchscreen, the activation interaction element EIA triggers eia_trg the activation/deactivation command EIA_CMD which transmits an ad hoc activation/deactivation signal acv to the communication device DC.

In another embodiment, when the user interacts vocally aact by commanding the activation through a phrase such as "active Wifi", this vocal activation interaction aact triggers eia_trg the activation/deactivation command EIA_CMD which transmits an ad hoc activation/deactivation signal acv to the communication device DC.

In particular, the management method DCMNGT comprises a radiation parameterizing command EIC_CMD for the communication device DC following the reproduction of an element of interaction with the radiation EIC_PRP when the user performs a radiation parameterizing interaction cact with the element of interaction with the parameterizing of the radiation EIC.

For example, the user moves a lobe in a direction $\theta_d$ on an interface as illustrated by FIG. 3b or selects one or more zones to be covered $702_{ZC1}$, $702_{ZC2}$ or not to be covered $702_{ZE}$ on a plan reproduced by an interface as illustrated by FIG. 3c. The radiation interaction, also called interaction with the coverage, cact: movement, selection, etc., triggers eic_trg the radiation command EIC_CMD which transmits a parameterizing signal pram to the controlling device DP which controls the direction of radiation rcmd from the communication device DC.

In particular, the at least one element of interaction EIC with a parameterizing of the radiation reproduced corresponds to a room of a reproduced plan of a building (see the illustration of FIG. 3c) in which the communication device 1 transmits.

In particular, the at least one element of interaction EIC with a parameterizing of the controller that is reproduced comprises one out of the following parameters:

a radiation mode,
an activation of a radiation mode,
a strength of a radiation mode,
a direction of a radiation mode,
a time slot of a radiation mode,
an event that can be determined as a function of sensed data, the event being able to trigger an activation of a radiation mode.

A particular embodiment of the method for controlling the orientation of the local radiation and/or of the method for managing a communication device is a program comprising program code instructions for the execution of the steps of the method for controlling the orientation of the local radiation and/or of the method for managing a communication device when said program is run by a processor.

The invention also targets a medium. The information medium can be any entity or device capable of storing the program. For example, the medium can comprise a storage means, such as a ROM, for example a CD ROM or a microelectronic circuit ROM or even a magnetic storage means, for example a diskette or a hard disk.

Also, the information medium can be a transmissible medium such as an electrical or optical signal which can be conveyed via an electrical or optical cable, wirelessly or by other means. The program according to the invention can in particular be downloaded over a network, notably of Internet type.

Alternatively, the information medium can be an integrated circuit in which the program is incorporated, the circuit being adapted to execute or to be used in the execution of the method concerned.

In another implementation, the invention is implemented by means of software and/or hardware components. To this end in this respect, the term module can correspond equally to a software component or to a hardware component. A software component corresponds to one or more computer programs, one or more subprograms of a program, or more generally to any element of a program or of software capable of implementing a function or a set of functions according to the above description. A hardware component corresponds to any element of a hardware set capable of implementing a function or a set of functions.

Although the present disclosure has been described with reference to one or more examples, workers skilled in the art will recognize that changes may be made in form and detail without departing from the scope of the disclosure and/or the appended claims.

The invention claimed is:

1. A controlling device for managing a local radio wave communication device, the controlling device comprising:
at least one interface device;
at least one processor; and
at least one non-transitory computer readable medium comprising instructions stored thereon which when executed by the at least one processor configure the controlling device to:

implement an activation interface by the at least one interface device, the activation interface being configured to activate the local radio wave communication device; and implement a radiation controlling interface by the at least one interface device, the radiation controlling interface being configured to control local radiation from the local radio wave communication device, said radiation controlling interface reproducing at least one element of interaction that parameterizes the local radio wave communication device for controlling the local radiation from the local radio wave communication device, wherein the at least one element of interaction is associated to a room of a reproduced plan of a building in which the local radio wave communication device transmits local radio waves, the at least one element of interaction controlling coverage and exclusion of coverage of the local radiation in the room such that activation of the radiation within the room is a function of activation of the associated at least one element of interaction.

2. The controlling device as claimed in claim 1, wherein the controlling device is implemented in a communication terminal connectable to a wireless local communication network.

3. The controlling device as claimed in claim 2, wherein the communication terminal is distinct from the local radio wave communication device.

4. The controlling device as claimed in claim 2, wherein the communication terminal corresponds to the local radio wave communication device.

5. The controlling device as claimed in claim 1, wherein the reproduced plan of the building comprises a plurality of rooms, and the instructions configure the controlling device to receive an interaction with the at least one element of interaction, which generates parameters for the local radio wave communication device that control coverage and exclusion of coverage of the local radiation for at least one of the rooms separately from at least one other of the rooms.

6. A method for managing a local radio wave communication device, the method being implemented by a controlling device and comprising:
reproducing at least one interaction element on an activation interface, which allows an activation of the local radio wave communication device, and
reproducing at least one interaction element on a radiation controlling interface, which parameterizes the local radio wave communication device for controlling local radiation from the local radio wave communication device, wherein the at least one interaction element reproduced on the radiation controlling interface is associated to a room of a reproduced plan of a building in which the local radio wave communication device transmits local radio waves and controls coverage and exclusion of coverage of the local radiation in the room such that activation of the radiation within the room is a function of activation of the associated at least one element of interaction.

7. The method for managing as claimed in claim 6, wherein the at least one interaction element reproduced on the radiation controlling interface comprises a parameter out of the following parameters:
a radiation mode,
an activation of a radiation mode,
a power of a radiation mode,
a direction of a radiation mode,
a scheduling of a radiation mode, and an event that can be determined as a function of sensed data, the event being able to trigger an activation of a radiation mode.

8. The method for managing as claimed in claim 6, wherein the reproduced plan of the building comprises a plurality of rooms, and the method comprises receiving an interaction with the at least one element of interaction reproduced on the radiation controlling interface, which generates parameters for the local radio wave communication device that control coverage and exclusion of coverage of the local radiation for at least one of the rooms separately from at least one other of the rooms.

9. At least one non-transitory computer readable medium comprising at least one program stored thereon comprising program code instructions for execution of a method for managing a local radio wave communication device when said at least one program is run by at least one processor of a controlling device, wherein the method comprises:

reproducing at least one interaction element on an activation interface, which allows an activation of the local radio wave communication device, and reproducing at least one interaction element on a radiation controlling interface, which parameterizes the local radio wave communication device for controlling local radiation from the local radio wave communication device, wherein the at least one interaction element reproduced on the radiation controlling interface is associated to a room of a reproduced plan of a building in which the local radio wave communication device transmits local radio waves and controls coverage and exclusion of coverage of the local radiation in the room such that activation of the radiation within the room is a function of activation of the associated at least one element of interaction.

10. The at least one non-transitory computer readable medium as claimed in claim 9, wherein the reproduced plan of the building comprises a plurality of rooms, and the method comprises receiving an interaction with the at least one element of interaction reproduced on the radiation controlling interface, which generates parameters for the local radio wave communication device that control coverage and exclusion of coverage of the local radiation for at least one of the rooms separately from at least one other of the rooms.

* * * * *